US006943200B1

(12) United States Patent
Corrand et al.

(10) Patent No.: US 6,943,200 B1
(45) Date of Patent: Sep. 13, 2005

(54) WATER UNSTABLE FOAM COMPOSITIONS

(75) Inventors: Didier Marcel Corrand, Siccieu (FR); David William York, Newcastle Upon Tyne (GB); Nigel Somerville-Roberts, Newcastle Upon Tyne (GB)

(73) Assignee: Procter & Gamble Company, Cincinnati, OH (US)

( * ) Notice: Subject to any disclaimer, the term of this patent is extended or adjusted under 35 U.S.C. 154(b) by 95 days.

(21) Appl. No.: 10/089,356

(22) PCT Filed: Oct. 4, 2000

(86) PCT No.: PCT/US00/27340

§ 371 (c)(1), (2), (4) Date: Mar. 27, 2002

(87) PCT Pub. No.: WO01/25390

PCT Pub. Date: Apr. 12, 2001

(30) Foreign Application Priority Data

Oct. 5, 1999 (GB) .............................................. 9923344

(51) Int. Cl.$^7$ .................................................. C08J 9/30
(52) U.S. Cl. ............................ 521/65; 521/82; 521/141
(58) Field of Search ............................ 521/65, 82, 141, 521/64

(56) References Cited

U.S. PATENT DOCUMENTS

| | | | | |
|---|---|---|---|---|
| 3,695,989 | A | * | 10/1972 | Albert |
| 3,887,614 | A | | 6/1975 | Susuki et al. |
| 5,458,884 | A | | 10/1995 | Britton et al. |
| 5,543,439 | A | * | 8/1996 | McDermott et al. |
| 5,736,586 | A | * | 4/1998 | Bastioli et al. |

FOREIGN PATENT DOCUMENTS

| | | |
|---|---|---|
| CN | 1019313 B | 12/1992 |
| JP | 48001500 | 1/1973 |

OTHER PUBLICATIONS

XP–00216642 Pat. Abstract 1973.

* cited by examiner

*Primary Examiner*—James J. Seidleck
*Assistant Examiner*—Irina S. Zemel
(74) *Attorney, Agent, or Firm*—C. Brant Cook; Caroline Wei-Berk; Kim W. Zerby

(57) ABSTRACT

The present invention relates to foam components comprising polymeric material and an active ingredient, such as detergent ingredients, which are to be delivered to aqueous environment. Highly preferred active ingredients include enzymes. The foam component is stable upon contact with air but dissolves, disintegrates or disperses in water. The invention also relates to compositions containing the foam components and methods for making the foam components.

16 Claims, No Drawings

WATER UNSTABLE FOAM COMPOSITIONS

TECHNICAL FIELD

The present invention relates to foam components comprising polymeric material and an active ingredient, such as detergent ingredients, which are to be delivered to an aqueous environment. The invention also relates to compositions containing the foam components and methods for making the foam components.

BACKGROUND OF THE INVENTION

Compositions such as cleaning products, personal-care products, cosmetics and pharmaceuticals often comprise active ingredients which are to be delivered to water or which are required to be active in aqueous conditions, but are sensitive to moisture, temperature changes, light and/or air during storage. Also, these compositions often contain ingredients which may react with one another. Therefore, such ingredient actives are often protected or separated from one another by coating agents or encapsulating agents. For example enzymes, used in detergents, are often incompatible with alkaline or acid materials, bleaches, moisture and light and thus coated to protect them. Because the active materials generally need to be delivered in aqueous conditions, the coating materials need to be chosen such that the coating and actives dissolve or disperse well in water. Many enzymes for example are coated with water-soluble coatings such as starch-based materials.

Another problem with many solid ingredients, in particular enzymes, is that they tend to form dust during handling due to physical forces. This not only creates waste product, but the dust can also cause hygiene and health problems. Again, coating of the ingredients can improve this problem to some extent. The problem with many coated particles is that they do not always exhibit sufficient impact resistance during handling. Thus, even when handling encapsulated enzyme particles, dust is formed which causes health and hygiene problems. A problem with many liquid ingredients is phase separation and with liquids in solid compositions is gelling of the product, migration or 'bleeding' of the liquids.

The inventors have now found an improved method of protecting actives and delivering actives in aqueous conditions. They found that when a specific foam component, comprising polymeric material and the active materials is used, effective delivery of the actives and protection of the actives, not only against air-moisture and chemical reactions but also against physical forces, is achieved. The foam component is found to be air-stable under normal humidity storage conditions, but water-unstable to thus deliver the actives, in particular the component disintegrates or dissolves in water, to thus deliver the actives.

The foam component is useful in any product, in particular useful in cleaning products, pharmaceutical products, personal-care products, cosmetic products and fabric-care products. The foams have been found to be very impact resistant, thus resulting in reduced braking-up or abrasion during handling and reduced dust formation. Foam components comprising liquid ingredients result in reduced gelling, reduced migration or phase separation. Foam components with for example enzymes can thus be obtained which are safer and more efficient to handle. Foam components incorporating liquid ingredients provide a convenient way to handle said liquids without the need for a separate container.

SUMMARY OF THE INVENTION

The present invention relates to a foam component comprising a mixture of a polymeric material and an active ingredient, preferably being active in aqueous environment, the foam component being stable upon contact with air and unstable upon contact with water.

The foam component preferably releases the active ingredient or part thereof upon contact with water, the component preferably partially or completely disintegrating, dispersing, denaturing and/or dissolving upon contact with water.

The foam component is preferable a flexible foam component.

Preferably the active ingredients are cleaning actives, personal-care or cosmetic actives or pharmaceutical actives. The foam component may also contain mixtures of active ingredients, which may be particularly useful to improve the storing of active ingredients which can react with one another. By use of the foam component, it can be achieved that such ingredients only react, or react with one another, once released into the aqueous conditions.

The foam component may preferably be in the form of particles which can be incorporated in compositions; or in the form of a sheet, preferably such that it can form a to foam sheet which can be used as protective coating for the composition; or in the form of a solid object such as a tablet, sphere, block or other shape allowing easy handling.

The invention also relates to processes for making the foam component, and compositions comprising the foam component.

The invention also relates to the use of a foam component according to the invention to deliver active ingredients to an aqueous environment, preferably the active ingredients being detergent active ingredients and the aqueous environment being the wash water. The foam component can be such that delayed release of the active ingredient to the aqueous environment can be achieved. The invention also relates to the use of a foam component according to the invention to incorporate enzymes in compositions, preferably detergent compositions.

DETAILED DESCRIPTION

Foam Component

The foam component of the invention comprises a polymeric material and an active ingredient. The foam component has a matrix formed from the polymeric material or part thereof, and optionally other materials. The matrix is preferably such that it forms an interconnected network of open and/or closed cells, in particular a network of solid struts or plates which form the edges and faces of open and/or closed cells. The spacing inside the cells can contain part of the active ingredient and/or a gas, such as air.

The polymer material and the active ingredient may be intimately, homogeneously mixed, in which case a so-called monophase foam component is obtained, which has uniform physical and chemical properties. However, it may be preferred that a multiphase foam component is obtained, whereby on a microstructure level one or more of the active ingredients is present in lower or higher amounts in one area of the component than in an other area of the component, and thus lower or higher than the average obtained by intimate mixing.

'Air-stable' or 'stable upon contact with air' when used herein, means that the bulk volume of the foam component substantially remains the same when exposed to air. This means in particular that the foam component herein retains preferably from 75% to 125% or even from 90% to 110% or even from 95% to 100% of its bulk volume when stored in an open beaker (9 cm diameter; without any protective barrier) in a incubator under controlled ambient conditions (humidity=RH 60%, temperature=25° C.) for 24 hours. Preferably the foam component retains from 75% to 125% or even from 90% to 110% or even from 95% to 100% of its bulk volume under the above storage conditions whereby the humidity is 80%.

The bulk volume change can be measured by any conventional method. In particular useful is a digital image recorder system containing a digital camera coupled to a personal computer itself equipped with a calibrated image analyser software. A 1 $cm^3$ specimen of the foam component is obtained and introduced in an open beaker having a diameter of 9 cm and stored for 24 hours at the above conditions. After 24 hours, the size in all three dimensions is measured with the image analysis recorder system. Each specimen measurement is repeated three times, and the average bulk volume change is calculated in %.

Preferably, the foam component is such that, when in the form of particles of a mean particle size of 2000 microns or less, these foam component particles also retain from 75% to 125% or even from 90% to 110% or even from 95% to 100% of their bulk volume. This can for example be measured by placing 20 grams of the foam component particles, or a weight comprising more than 500 particles, in a volumetric beaker having a diameter of 9 cm. The beaker is taped lightly on its base until the foam component particles re-arrange themselves in a stable position with a horizontal top surface. The volume is measured. The open beaker with the foam component particles is then carefully placed in the incubator for 24 hours, set to the desired %RH and temperature. The bulk volume after the 24 hours is measured and the change of bulk volume is calculated in %.

The foam component of the invention is unstable when brought into contact with water. This occurs such that the active ingredients or part thereof, present in the foam component is delivered to the water. Preferably the foam component or part thereof denatures, disintegrates, preferably disperses or dissolves in water. It may he preferred that the active ingredient is delivered rapidly and that the foam component is such that the polymeric material of the foam component disperses or dissolves rapidly, preferably at least 10% of the polymeric material, by weight, is dissolved or dispersed in 30 minutes after contacting the foam component with the water., more preferably at least 30% or even at least 50% or even at least 70% or even at least 90% (introduced in the water at a 1% by weight concentration). It may even be preferred that this happens within 20 minutes or even 10 minutes or even 5 minutes after contacting the foam component with the water. The dissolution or dispersion can be measured by the method described herein after for measuring the dissolution and dispersion of polymers.

Preferably the water-unstable foam component is such that the total volume of the foam component is changed, preferably reduced, with at least 10%, compared to the initial total volume, as for example can be determined when 1 $cm^3$ of a foam component is added to 100 ml of demineralised water upon and stirred for 5 minutes at a speed of 200 rpm, at a temperature of 25° C. Preferably the change, or preferably reduction, in total volume is at least 20% or even at least 40% or even at least 60% or even at least 90% or even about 100%, e.g. because it may be preferred that substantially the whole foam component is disintegrated, dispersed or dissolved into the water quickly.

This can be measured by use of any method known in the art, in particular herein with a method as follows (double immersion technique):

1 $cm^3$ of a foam component is obtained and introduced in a 100 ml micro volumetric measuring cylinder which is filled with 50 ml±0.1 ml of an organic inert solvent. Acetone is for example used when found to be neither denaturing and/or not interacting with the polymeric material in the foam component, for example when this is PVA. Other neutral organic medium can be used according to the nature of the foam under investigation; the inert solvent is such that the foam component is substantially not dissolved, dispersed, disintegrated or denatured by the solvent.

The cylinder is air scaled and left to rest for 1 minute so that the solvent penetrates the whole foam specimen. The change in volume is measured and taken as the original volume $V_i$ of the foam specimen. The foam specimen is then removed from the solvent and left to dry in air so that the solvent evaporates.

The foam specimen is then placed in a 250 ml beaker containing 100 ml of demineralised water, maintained at 25° C., under stirring at 200 rpm with the help of a magnetic stirrer, for 5 minutes. The remaining of the foam component specimen is filtered off with a 60 mm mesh copper filter and placed in a oven at a temperature and for a period such that residual water is removed. The dried remaining foam component is re-introduced in the measuring cylinder which volume of acetone had been re-adjusted to 50 ml.

The increase in total volume is monitored and taken as the final volume of the foam specimen $V_f$. The decrease in total volume $\Delta V$ of the foam specimen is then:

$$\%\Delta V = \frac{Vf}{Vi} * 100$$

The foam component has preferably a relative density $\phi_{foam}^*$ of from 0.01 to 0.95, more preferably from 0.05 to 0.9 or even from 0.1 to 0.8 or even form 0.3 to 0.7. The relative density is the ratio of the density of the foam component to the sum of the partial densities of all the bulk materials used to form the foam component, as described below:

$$\rho_{foam}^* = \frac{\rho_{foam}}{\rho_{bulk}} = \frac{\rho_{foam}}{\sum_{i=1}^{i=n} \chi_i \rho_i}$$

where ρ is the density, and $\chi_i$, is the volume fraction of the materials i in the foam components.

It is preferred that the foam component is a flexible foam component. In particular, this means that the flexible foam component reversibly deforms, absorbing the energy of impacts or of forces so that the foam component remains substantially its original bulk volume after the physical force seizes to be applied on the component.

In particular this means that when a foam component sample having a cross section of a specific length, for example 1 cm, is compressed with a static force applied along the axis of that cross section, the static force being variable but at least equivalent to twice atmospheric pressure, the change of this length after removal of the force is at least 90% to 110% of the original length. This can for example be measured by use of Perkin-Elmer DMA 7e equipment.

Similarly, the foam component is preferably flexible to such an extend that when a foam component sample having a cross section of a specific length, for example 1 cm, is stretched with a static force applied along the axis of that cross section, the static force being variable, but at least equivalent to twice atmospheric pressure, the change of this length after removal of the force is at least 90% to 1 10% of the original length. This can for example be measured by use of Perkin-Elmer DMA 7e equipment.

The flexibility of a foam component can also be reflected by the Young's or elastic modulus, which can be calculated from strain or stress mechanical tests as known in the art, for example by using Perkin-Elmer DMA 7e equipment following the manufacturer's experimental procedure. For example a foam component of 1 $cm^3$ can be used in the testing with this equipment.

In particular, when using this equipment, the static forces applied along the axis of a cross section of a 1 $cm^3$ foam component are gradually increased until the deformation of the component, in the direction of the cross section, is 70%. Then, the force is removed and the final deformation of the foam component in the direction of the cross section is measured. Preferably, this length of the cross section after this experiment is preferably from 90% to 110% of the original length of the cross section, preferably from 95% to 105% or even from 98% to 100%.

The foam component herein preferably has an elastic modulus or Young's modulus of less than 10 $GN.m^{-2}$, even more preferentially less than 1 $GN.m^{-2}$, as measured with the Perkin-Elmer DMA 7e equipment. Preferably the polymeric component has a relative yield strain greater than 2%, and preferably greater than 15% or even greater than 50%, as measured with the Perkin-Elmer DMA 7e equipment. (The yield strain is in this measurement the limit deformation of a foam component at which the component deforms irreversible).

The elastic modulus or Young modulus is related to the relative density, namely $$\frac{E^*}{E_s} \approx \left(\frac{\rho^*}{\rho_s}\right)^2,$$

where p* and $p_s$ are as described above and E* is the Young's modulus of the foam component, and $E_s$ that of the polymeric material. This means that even stiff polymeric materials, with a high $E_s$ can be made into relatively flexible foams, by modifying the density thereof, in particular by introducing more gas in during the foam making process or by using additives, such as plasticisers at adjusted levels.

The foam component comprises preferably at least 1% by weight of the active ingredients, more preferably from 5% to 95%, more preferably from 10% to 80% or even from 15% to 70%.

The foam component comprises preferably at least 1% by weight of the polymeric material, more preferably from 10% or even 20% or even 25% to 99%, more preferably from 30% to 90% or even from 35% to 90% or even to 80% by weight.

Matrix

The foam component comprises a matrix, formed from or partially formed from at least part of the polymeric material. This means that the matrix may be formed completely by the polymeric material, or the matrix may be formed partially by the polymeric material and partially by the active ingredient or part thereof, or by other additional ingredients.

The matrix is preferably such that it forms an interconnected network of open and/or closed cells, in particular a network of solid struts or plates which form the edges and faces of open and/or closed cells. Then, the polymeric material or part thereof, forms at least part of the struts or plates, whilst the active ingredient, and optionally other materials, may form part of the struts or plates.

Polymeric Material

Any polymeric material which can be formed into a air-stable, water-unstable foam, can be used in the foam component and can be used to form the matrix or part thereof, of the foam component. Preferred it that the polymeric material comprises a water-dispersible or more preferably a water-soluble polymer.

Preferred water-dispersable polymers herein have a dispersability of at least 50%, preferably at least 75% or even at least 95%, as measured by the method set out hereinafter using a glass-filter with a maximum pore size of 50 microns; more preferably the polymer herein is a water-soluble polymer which has a solubility of at least 50%, preferably at least 75% or even at least 95%, as measured by the method set out hereinafter using a glass-filter with a maximum pore size of 20 microns, namely:

Gravimetric method for determining water-solubility or water-dispersability of polymers: 50 grams±0.1 gram of polymer is added in a 400 ml beaker, whereof the weight has been determined, and 245 m±1 ml of distilled water is added. This is stirred vigorously on magnetic stirrer set at 600 rpm, for 30 minutes. Then, the water-polymer mixture is filtered through a folded qualitative sintered-glass filter with the pore sizes as defined above (max. 20 or 50 microns). The water is dried off from the collected filtrate by any conventional method, and the weight of the remaining polymer is determined (which is the dissolved or dispersed fraction). Then, the % solubility or dispersability can be calculated.

Preferred are polymers selected from cationic polymers, such as quaternary polyamines, polyvinyl alcohols, polyvinyl pyrrolidone, polyalkylene oxides, cellulose, polysaccherides, polycarboxylic acids and salts, polyaminoacids or peptides, polyamides, polyacrylamide, or derivatives or copolymers thereof More preferably the polymer is selected from polyvinyl alcohols, cellulose ethers and derivatives thereof, copolymers of maleic/acrylic acids, polysaccharides including starch and gelatine, natural gums such as xanthum and carragum.

Copolymers block polymers and graft polymers of the above can also be used. Mixtures of polymers can also be used. This may in particular be beneficial to control the mechanical and/or dissolution properties of the foam component, depending on the application thereof and the required needs.

The polymer can have any average molecular weight, preferably from about 1000 to 1,000,000, or even form 4000 to 250,000 or even form 10,000 to 200,000 or even form 30 20,000 to 75,000.

Preferred can be that the polymer used in the foam component herein has a secondary function in the composition wherein the foam component is to be incorporated. Thus for example is cleaning products, it is useful when the polymer is a builder polymer, soil release polymer, dye transfer inhibiting polymer, process aid, suds suppressor, dispersant, flocculant etc.

Preferred polymers in cleaning compositions may be homopolymers or copolymers containing monomeric units selected from alkylene oxide, particularly ethylene oxide, acrylamide, acrylic acid, vinyl alcohol, vinyl pyrrolidone, and ethylene imine, organic to polymeric clay flocculating agents as described in European Patents No.s EP-A-299,575 and EP-A-313,146, more preferred polyvinylpyrrolidones, polyacrylates and water-soluble acrylate copolymers, methylcellulose, carboxymethylcellulose sodium, dextrin, ethylcellulose, gelatin, guar gum, hydroxyethyl cellulose, hydroxypropyl methylcellulose, maltodextrin, polymethacrylates, cationic polymers including ethoxylated hexamethylene diamine quaternary compounds, bishexamethylene triamines, or others such as pentaamines, ethoxylated polyethylene amines, polyamino compounds such as those disclosed in EP-A-305282, EP-A-305283 and EP-A-351629, terpolymers containing monomer, non-cotton soil release polymer as described in to U.S. Pat. No. 4,968,451, and U.S. Pat. No. 5,415,807, dispersant/anti-redeposition agent, for use herein, can be the ethoxylated cationic monoamines and diamines, as described in EP-B-011965 and U.S. Pat. Nos. 4,659,802 and 4,664,848.

Active Ingredient

The active ingredient can be any material which is to be delivered to an aqueous environment and preferably an ingredient which is active in an aqueous environment. For example, when used in cleaning compositions the foam component can contain any active cleaning ingredients.

In particular, it is beneficial to incorporate in the foam component active ingredients which are moisture sensitive or react upon contact with moisture, or solid ingredients which have a limited impact robustness and tend to form dust during handling. In particular preferred in foam components are active ingredients such as enzymes, perfumes, bleaches, bleach activators, fabric softeners, fabric conditioners, surfactants, such as liquid nonionic surfactant, conditioners, antibacterial agents, effervescence sources, brighteners, photo-bleaches and mixtures thereof.

Preferred are anionic surfactants, which include salts (including, for example, sodium, potassium, ammonium, and substituted ammonium salts such as mono-, di- and triethanolamine salts) of the anionic sulfate, sulfonate, carboxylate and sarcosinate surfactant, preferably linear or branched alkyl benzene sulfonate, alkyl sulphates and alkyl ethoxylsulfates, isethionates, N-acyl taurates, fatty acid amides of methyl tauride, alkyl succinates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), N-acyl sarcosinates.

Also preferred are nonionic surfactants such as nonionic surfactant, preferably selected from can be selected from the classes of the nonionic condensates of alkyl phenols, nonionic ethoxylated alcohols, nonionic ethoxylated/propoxylated fatty alcohols, nonionic ethoxylate/propoxylate condensates with propylene glycol, and the nonionic ethoxylate condensation products with propylene oxide/ethylene diamine adducts.

Cationic surfactants and softening agents may also be included as active ingredient in the foam component herein, for example to quaternary ammonium surfactants and softening agents, and choline ester surfactants.

Perfume may also be included as an active ingredient for use herein.

Another active ingredient is a perhydrate bleach, such as metal perborates, metal percarbonates, particularly the sodium salts. Also preferred active ingredients are organic peroxyacid bleach precursor or activator compound, preferred are alkyl percarboxylic precursor compounds of the imide type include the N-,N,$N^1N^1$ tetra acetylated alkylene diamines wherein the alkylene group contains from 1 to 6 carbon atoms, particularly those compounds in which the alkylene group contains 1, 2 and 6 carbon atoms such as tetraacetyl ethylene diamine (TAED), sodium 3,5,5-trimethyl hexanoyloxybenzene sulfonate (iso-NOBS), sodium nonanoyloxybenzene sulfonate (NOBS), sodium acetoxybenzene sulfonate (ABS) and pentaacetyl glucose, but also amide substituted alkyl peroxyacid precursor compounds.

Highly preferred active ingredient for use in the foam component herein are one or more enzymes. Preferred enzymes include the commercially available lipases, cutinases, amylases, neutral and alkaline proteases, cellulases, endolases, esterases, pectinases, lactases and peroxidases conventionally incorporated into detergent compositions. Suitable enzymes are discussed in U.S. Pat. Nos. 3,519,570 and 3,533,139. Preferred commercially available protease enzymes include those sold under the tradenames Alcalase, Savinase, Primase, Durazym, and Esperase by Novo Industries A/S (Denmark), those sold under the tradename Maxatase, Maxacal and Maxapem by Gist-Brocades, those sold by Genencor International, and those sold under the tradename Opticlean and Optimase by Solvay Enzymes. Preferred amylases include, for example, α-amylases obtained from a special strain of B licheniformis, described in more detail in GB-1,269,839 (Novo). Preferred commercially available amylases include for example, those sold under the tradename Rapidase by Gist-Brocades, and those sold under the tradename Termamyl, Duramyl and BAN by Novo Industries A/S. Highly preferred amylase enzymes maybe those described in PCT/US 9703635, and in WO95/26397 and WO96/23873. The lipase may be fungal or bacterial in origin being obtained, for example, from a lipase producing strain of *Humicola* sp., *Thernomyces* sp. or *Pseudomonas* sp. including *Pseudomonas pseudoalcaligenes* or *Pseudomas fluorescens.* Lipase from chemically or genetically modified mutants of these strains are also useful herein. A preferred lipase is derived from *Pseudomonas pseudoalcaligenes,* which is described in Granted European Patent, EP-B-0218272.

Another preferred lipase herein is obtained by cloning the gene from *Humicola lanuginosa* and expressing the gene in *Aspergillus oryza,* as host, as described in European Patent Application, EP-A-0258 068, which is commercially available from Novo Industri A/S, Bagsvaerd, Denmark, under the trade name Lipolase. This lipase is also described in U.S. Pat. No. 4,810,414, Huge-Jensen et al, issued Mar. 7, 1989.

Process for Making the Foam Component

The foam component may be made by any process known in the art for making foam components, preferably involving at least a step of mixing the polymeric material with the active ingredient.

Preferably the process comprises the steps of a) obtaining a polymeric material;

b) chemically or physically introducing gas in said polymeric material;

c) prior to step b) and/or simultaneously with step b) and/or subsequently to step b), addition of the active ingredient to the polymer material;

d) optionally addition a of further ingredients, preferably including a plasticiser and/or with a liquid, preferably water, in one or more of steps a), b) or c e) optionally one or more of steps b), c) or d) followed by removal of the liquid or part thereof.

The active ingredient can be mixed with the polymeric material prior to step b) or preferably the active ingredient is added subsequently to step b). This process herein is preferably such that in step a) a plasticiser is present in the mixture and preferably also water.

The foam component herein can also be obtained by a process comprising the step of a) formation of a mixture of the polymeric material, the active ingredient and a liquid, preferably water;

b) evaporation of the liquid or part thereof to form spacings which are the areas inside cells of the matrix of the foam component.

Step b) is preferably conducted by submitting the mixture of a) to pressure, preferably under mixing and/or increasing the temperature, and subsequently removing the pressure or part thereof, thereby causing the liquid to evaporate. For example, an extrusion process can be used. Hereby it is preferred that the mixture of the polymeric material, active ingredient and liquid, preferably water, is introduced in an extruder, wherein the mixture is further mixed and heated, due to the mixing or due to applying heat, preferably such that the mixture or polymeric material therein forms a melt, and then dropping the pressure at the exit point where the extruded mixture (which can be formed into the desired form, for example granules) exits the extruder, whereby the liquid or part thereof evaporates, or preferably the water evaporates as steam from the extruded mixture. This results in formation of cells with spacings, as described above, which then may contain a gas, preferably air, and optionally the active ingredient. These spacings form the internal area of the cells of the matrix of the foam component of the invention.

Step b) in the process may also be conducted by heating the mixture to cause the liquid or part thereof to evaporate, resulting in the formation of spacings, as above. This can preferably done by feeding the mixture into a spray drying tower, preferably such that the mixture is fed through spray nozzles which form droplets of the mixture, and spray drying the droplets at conventional, resulting in granules of the foam component.

The physical foaming and/or chemical foaming can be done by any known method, preferred are physical foaming by gas injection (dry or aqueous route), high shear stirring (dry or aqueous route), gas dissolution and relaxation including critical gas diffusion (dry or aqueous route);

chemical foaming by in-situ gas formation (via chemical reaction of one or more ingredients, including formation of $CO_2$ by an effervescence system), steam blowing, UV light radiation curing.

Also preferred, as set out above, is a process whereby the mixture of polymeric material, actives and liquid is treated such that the liquid or part thereof evaporates, leaving spacings in the mixture, which then preferably are filled by a gas, resulting in the foam component of the invention.

These foaming steps such as step b or step c in the first process above, but also preferably the last steps of the second process, are preferably followed by a drying step or additional drying step to remove excess liquid, such as water, which may be present. In particular, the drying step is done after the polymer material is foamed and the active ingredient is added, thus as final step in the process. The drying step is done final foam component is of about the same volume after the drying step as before the drying step. Thereto, the drying step is preferably done by freeze-drying, whereby the solvent, e.g. water, is removed under vacuum and reduced temperatures. Also useful can be slow oven drying at modestly increased temperatures, such as 40–80° C., or even 40–60° C. for example 2–40 to hours, preferably 10–30 hours.

As described herein, it can be useful that the foam component comprises at a plasticiser or a stabiliser or preferably, at least one acidic ingredient, which may be the active ingredient, or part thereof, or the polymer material or part thereof, or n additional acidic ingredient, to improve foam formation and stabilization.

EXAMPLE 1

Physical Foaming

Apparatus: Microbalance, graduated 100 ml flask, Kenwood "Chef" food processor with provided whisk and mixing bowl, glass or plastic moulds, spatula.

Chemicals: Poly (vinyl alcohol) (Aldrich chemicals, molecular weight Mw=30–70 k), Glycerol (99%, Aldrich chemicals), Citric Acid (Aldrich, Citric Acid, USP Anhydrous), distilled water, dry ice (or solid phase $CO_2$), thermally insulated box.

Procedure

1. Weigh 50±0.2 grams of PVA, 30±0.2 grams of glycerol, 20±0.2 grams of citric acid.
2. Mix the PVA, glycerol and Citric acid using the mixer set a low speed (mark 2).
3. Add 50±1 ml of water gradually to the dry mix maintaining the mechanical mix for 2 minutes. A smooth gel should be obtained.
4. Increase the mix speed to the maximum setting (mark 8). Add 10–20 ml of water until a PVA foam is forming. Maintain high shear mixing for 3 minutes.
5. The active ingredients, for example from 2–10 gram of enzyme, are progressively added to the foam under a maintained mechanical mixing so that a uniform active foam is obtained.
6. Stop mixing. Spread the PVA foam in moulds avoiding any collapsing of the structure.
7. Place the filled moulds in a thermally insulated box ⅓ filled with dry ice. Leave to freeze for 5 hours.
8. Quickly place frozen samples in a vacuum freeze-dryer (for example, Edwards Lyoflex 08) for 24 hours.
9. Remove dried sample from moulds.

Any active ingredient can be added in step 5, at any level, normally up to about 50 grams or up to about 500 g, for example fabric softeners, bleaching species, nonionic surfactants

EXAMPLE 2

Chemical Foaming

Apparatus: as described in Example 1

Chemicals: Poly (vinyl alcohol) (Aldrich chemicals, molecular weight Mw=30–70 k), Glycerol (99 %, Aldrich chemicals), Citric Acid (Aldrich, Citric Acid, USP Anhydrous), Sodium carbonate (Aldrich, Anhydrous), Dodecyl Sulphate surfactant (Aldrich), distilled water, Petri dish (diameter 90 mm), Oven (set at 45° C.±2° C.)

Procedure

1. Weigh 50±0.2 grams of PVA, 30 ±0.2 grams of glycerol, 20±0.2 grams of citric acid, 20±0.2 grams of sodium carbonate, and 2±0.2 grams of dodecyl sulphate,
2. Mix the PVA, glycerol, citric acid and dodecyl sulphate using the mixer set a low speed (mark 2).
3. Add 50±1 ml of water gradually to the dry mix maintaining the mechanical mix for 2 minutes. A smooth gel should be obtained.
4. Add the active ingredient, for example 5 gram enzyme, and sodium carbonate and mix vigorously for 30 second until a fully expanded foam is obtained.
5. Spread the foam in petri dish in a uniform 1 cm thick layer
6. Place petri dish in 40° C. oven for 24 hours.
7. Remove the dried foam film from mould.

Any active ingredient can be added in step 4, at any level, normally up to about 50 grams, for example fabric softeners, bleaching species, nonionic surfactants.

Example 1 was repeated by using for example 40 wt % polycarboxylic acid polymer, 30 wt % diethyleneglycol, 15 wt % amine oxide and as active ingredient 1 wt % enzyme, softening clay etc.; and repeated by using 40 wt % polycarboxylic acid polymer, 30 wt % polyethylene glycol, 15 wt % amine oxide and acid LAS (1:1) and as active ingredient 15 wt % enzyme, softening clay etc.

Example 2 was repeated by using 55 wt % polycarboxylic acid polymer, 20 wt % anhydrous sodium carbonate and 25 wt % enzyme, softening clay etc.; and repeated by using 45 wt % polycarboxylic acid polymer, 15 wt % polyethylene glycol, 20 wt % anhydrous sodium carbonate and 20 wt % enzyme, softening clay etc.

Form of Foam Component

The foam component can be made into any form, by any conventional method. Preferred may be that the foam component is in the form of a particles, including pastilles and beads, tablets, or in the form of a sheet. The particles can be made by any granulation method, for example by grinding larger shapes of the foam component, such as the sheets described herein, spray-drying, extrusion, as also described above.

Preferred particles of the foam component have a mean particle size of from 10 to 5000 microns, more preferably from 50 to 4000 microns or even to 2000 microns, even more preferably from 100 to 1500 microns or even form 200 to 1000 microns.

The foam component may also be in the form of a sheet, which can be obtained by any method, preferably by forming the sheet in a mould, as described above. When the foam component is in the form of a sheet, the sheet can have any dimension and can be subsequently reduced in size as required. It may be preferred that the sheet has a mean thickness of from of from 0.01 microns to 10 centimeters, more preferably from 0.05 microns to 5 centimeters, or even more preferably from 0.1 microns to 3 centimeters microns.

The foam component may also be in the form of any other three-dimensional shape such as a sphere, cylinder, cube or other geometrical shape; or any other shape desired for the final product function, for example letters to indicate a name or an animal shape for a children's product.

It may be preferred that the foam component is in such a form, preferably a sheet form, that it can be used to encapsulate a product. Preferred may be that the foam component form a pouch structure around the product. For example, the foam component can be sued to encapsulate a cleaning product, fabric care product, personal care product, cosmetic product or pharmaceutical product.

Such an encapsulate or pouch can for example conveniently be made by heat sealing a sheet of the foam component around the product.

Additional Ingredients

In addition to the active component and polymeric material, the foam component may comprise additional ingredients, for example to strengthen the foam component or make the foam component more flexible, foam stabilisers, more water-soluble or water-dispersable, more storage stable, or for example to colour or bleach the foam component.

It may be preferred that the foam component comprises a plasticiser. Preferred plasticisers are selected from glycerol, ethylene glycol, diethyleneglycol, propylene glycol, sorbitol and mixtures thereof. Preferred levels are from 0.05% to 15% or even from 0.2% to 10% or even form 0.3 to 5% by weight of the foam component.

Colouring agent such as iron oxides and hydroxydes, azo-dyes, natural dyes, are also preferred, preferably present at levels of 0.001% and 10% or even 0.01 to 5% or even 0.05 to 1% by weight of the component.

Highly preferred additional ingredients include urea and/or inorganic salts.

Water may be present in the foam component, but preferably only in small amount, any excess being removed by drying, such as freeze drying described herein. Generally, water is present at a level of 0% to 10%, more preferably from 0.2% to 5% or even 0.2% to 3% or even form 0.5% to 2% by weight of the foam component.

Preferred are also dispensing aids, dissolution aids or disintegrating aids. Examples of such aids are described in EP851025-A and EP466484-A. It should be understood that the polymeric material herein may comprise polymers which also act as dispensing aids, dissolution aids or disintegrating aids.

It may be preferred that the foam component contains an acidic material and/or an alkaline material and/or buffering agent, which may be the polymeric material and/or the active ingredient, or an additional ingredient. For example, it may be preferred that the polymeric material comprises an acidic polymer, for example a polycarboxylic acid polymer, or that the foam component comprises as active ingredient an effervescence source comprising an acidic compound and a carbonate source.

It has been found that in particular the presence of an acidic material improves the dissolution and/or dispersion of the foam component of the invention upon contact with water, and can also reduce or prevent interactions, leading to for example precipitation, of the polymeric material in the foam component with cationic species present in the aqueous medium.

Preferred is that the foam component comprises an acid such as citric acid, acetic acid, acetic acid glacial, fumaric acid, hydrochloric acid, malic acid, maleic acid, tartaric acid, nitric acid, phosphoric acid, sulfuric acid, pelargonic acid, lauric acid. Buffering agent which may be present include boric acid, sodium acetate, sodium citrate, acetic acid, potassium phosphates and the likes.

Preferred additional ingredients, when not included in the active ingredients herein include effervescing sources, in particular based on an acid and a carbonate source.

Suitable acids include the materials described above; suitable carbonate sources include salts of carbonate, bicarbonate, percarbonate, in particular sodium salts thereof The component of the invention preferably comprises additional ingredients which can improve the dissolution properties of the article herein.

Preferred additional ingredient which improve the dissolution of the article herein preferably comprise; a sulfonated compound such as $C_1$—$C_4$ alk(en)yl sulfonates, $C_1$–$C_4$ aryl sulfonates, di iso butyl benzene sulphonate, toluene sulfonate, cumene sulfonate, xylene sulfonate, salts thereof such as sodium salts thereof, derivatives thereof, or combinations thereof, preferably di iso butyl benzene sulphonate, sodium toluene sulfonate, sodium cumene sulfonate, sodium xylene sulfonate, and combinations thereof; and/or a $C_1$–$C_4$ alcohol such as methanol, ethanol, propanol such as iso-propanol, and derivatives thereof, and combinations thereof, preferably ethanol and/or iso-propanol; and/or a $C_4$–$C_{10}$ diol such as hexanediol and/or cyclohexanediol, preferably 1,6-hexanediol and/or 1,4-cyclohexanedimethanol; and/or ingredients which are capable of acting as whicking agents, such as cellulosic based ingredients, especially modified cellulose; and/or swelling agents such as clays, preferred clays are smectite clays, especially dioctahedral or trioctrahedral smectite clays, highly preferred clays are montmorillonite clay and hectorite clay, or other clays found in bentonite clay formations; and/or an effervescence system, a preferred effervescence system comprises an acid source capable of reacting with an alkali source in the presence of water to produce a gas.

The component of the invention preferably comprises additional ingredients which can improve the stability of the active ingredient of the article herein.

These additional ingredients are typically capable of stabilising the active ingredient of the component herein, this is especially preferred when the active ingredient(s) comprise an oxidative or moisture sensitive active ingredient, such as one or more enzymes. These additional ingredients may also stabilise the matrix of the component herein, and thus indirectly stabilise the active ingredient. These stabilising ingredients are defined herein as "stabilising agents".

The stabilising agent is preferably a compound which stabilises the active ingredient, or matrix, from oxidative and/or moisture degradation during storage. The stabilising agent may be, or comprise, a foam matrix stabiliser. The stabilising agent may be, or comprise, an active ingredient stabiliser, especially an enzyme stabilizer. Stabilising agents which are capable of stabilising the active ingredient indirectly by keeping the foam matrix of the article stable, herein referred to as "foam stabiliser".

Foam stabilisers preferably comprise a surfactant such as a fatty alcohol, fatty acid, alkanolamide, amine oxide, or derivatives thereof, or combinations thereof. The foam stabiliser may comprise betaine, sulfobetaine, phosphine oxide, alkyl sulfoxide, derivatives thereof, or combinations thereof.

Other preferred foam stabilisers comprises one or more anions or cations such as mono-, di-, tri-valent, or other multivalent metal ions, preferred are salts of sodium, calcium, magnesium, potassium, aluminium, zinc, copper, nickel, cobalt, iron, manganese and silver, preferably having an anionic counterion which is a sulphate, carbonate, oxide, chloride, bromide, iodide, phosphate, borate, acetate, citrate, and nitrate, and combinations thereof.

The foam stabiliser may comprise finely divided particles, preferably finely divided particles having an average particle size of less than 10 micrometers, more preferably less than 1 micrometer, even more preferably less than 0.5 micrometers, or less than 0.1 micrometers. Preferred finely divided particles are aluminosilicates such as zeolite, silica, or electrolytes described hereinbefore being in the form of finely divided particles.

The foam stabiliser may comprise agar-agar, sodium alginate, sodium dodecyl sulfate, polyethylene oxide, guar gum, polyacrylate, or derivatives thereof, or combinations thereof.

The foam stabiliser may be coating which is separate to the matrix of the article herein. The foam stabiliser typically partially encloses, preferably completely encloses, the article herein or the active ingredient thereof.

The coating is typically contacted to, preferable in such a manner as to form a coat on, the active ingredient prior to said active ingredient being contacted to the polymeric material or the plasticiser of the matrix, and preferably being incorporated in the article herein.

The coating may typically be contacted to, preferable in such a manner as to form a coat on, the article herein subsequent to the polymeric material and the plasticiser forming the matrix, and preferably subsequent to the active ingredient contacting said matrix or being incorporated in the article herein.

Preferred coating comprises polymers, typically selected from polyvinyl alcohols and derivatives thereof, polyethylene glycols and derivatives thereof, polyvinyl pyrrolidone and derivatives thereof, cellulose ethers and derivatives thereof, and copolymers of these polymers with one another or with other monomers or oligomers. Most preferred are PVP (and derivatives thereof) and/or PEG (and derivatives thereof) and most preferably PVA (and derivatives thereof) or mixtures of PVA with PEG and/or PVP (or derivatives thereof). These polymers do not form the matrix of the article herein. Thus, these polymers arc different to the polymeric materials of the foam matrix.

A preferred coating comprises compounds such as glycerol or glycerine, glycol derivatives including ethylene glycol, digomeric polyethylene glycols such as diethylene glycol, triethylene glycol and tetraethylene glycol, polyethylene glycol with a weight average M.W. of below 1000, wax and carbowax, ethanolacetamide, ethanolformamide, triethanolamine or acetate thereof, and ethanolamine salts, sodium thiocyanates, ammonium thiocyanates, polyols such as 1,3-butanediol, sugars, sugar alcohols, ureas, dibutyl or dimethyl pthalate, oxa monoacids, oxa diacids, diglycolic acids and other linear carboxylic acids with at least one ether group distributed along the chain thereof, water or mixtures thereof. These compounds do not form the foam matrix of the article herein. Thus, these compounds are different to the plastisicer of the foam matrix.

Preferred stabilising agents that are capable of stabilising the active ingredient directly, especially if said active ingredient comprises one or more enzymes, are defined herein as "active stabilisers" or "enzyme stabilisers". Typically active stabilisers interact directly with, and stabilise, the active ingredient.

Typical active stabilisers for use herein preferably comprise a surfactant. Suitable surfactants for use herein are those described hereinbefore as surfactants suitable for use as matrix stabilisers. In addition to these surfactants, other surfactants suitable for use herein may comprise surfactants such as sodium alky(en)yl sulfonates, sodium alkoxysulfonates, preferred alkoxysulfonates are those comprising from 10 to 18 carbon atoms in any conformation, preferably linear, and having an average ethoxylation degree of from 1 to 7, preferably from 2 to 5.

Other preferred active stabilisers comprise boric acid, formic acid, acetic acid, and salts thereof. These acid salts preferably comprise counerions such as calcium and/or sodium.

Preferred active stabilisers comprise cations such as calcium and or sodium. Preferably calcium chloride and/or sodium chloride.

Other preferred active stabilisers comprise small peptide chains averaging from 3 to 20, preferably from 3 to 10 amino acids, which interact with and stabilise the active ingredient, especially enzyme(s).

Other active stabilisers comprise small nucleic acid molecules, typically comprising from 3 to 300, preferably from 10 to 100 nucleotides. Typically nucleic acid molecules are deoxyribonucleic acid and ribonucleic acid. The nucleic acid molecules may be in the form of a complex with other molecules such as proteins, or may form a complex with the active ingredient of the article herein, especially enzyme(s).

Active stabilisers suitable for use herein, especially when the article herein comprises a bleach, comprise anti-oxidants and/or reducing agents such as thiosulphate, methionine, urea, thiourea dioxide, guanidine hydrochloride, guanidine carbonate, guanidine sulfamate, monoethanolamine, diethanolamine, triethanolamine, amino acids such as glycine, sodium glutamate, proteins such as bovine serum albumin and casein, tert-butylhydroxytoluene, 4-4,-butylidenebis (6-tert-butyl-3-methyl-phenol), 2,2'-butlidenebis (6-tert-butyl-4-methylphenol), (monostyrenated cresol, distyrenated cresol, monostyrenated phenol, distyrenated phenol, 1,1-bis (4-hydroxyphenyl) cyclohexane, or derivatives thereof, or a combination thereof.

Other active stabilisers may comprise a reversible inhibitor of the active ingredient. Without wishing to be bound by theory, it is believe that a reversible inhibitor of the active ingredient, especially if the active ingredient comprises one or more enzymes, may form a complex with, and improve the stability of, said active ingredient, and thus, stabilises the active ingredient during storage. When the active ingredient is released, typically into a liquid environment, the reversible inhibitor dissociates from the active ingredient and the active ingredient is then able to perform the desired action it is designed or intended to perform.

Active stabilisers suitable for use herein may comprise sugars, Typical sugars for use herein include those selected from the group consisting of sucrose, glucose, fructose, raffinose, trehalose, lactose, maltose, derivatives thereof, and combinations thereof.

The active stabiliser may also comprise sugar alcohols such as sorbitol, mannitol, inositol, derivatives thereof, and combinations thereof.

It may be preferred that the active stabiliser is in the form of a coating or barrier which at least partially encloses the article herein or the active ingredient thereof, preferably completely encloses the article herein or the active ingredient thereof, especially an enzyme.

Compositions Comprising the Foam Component

The foam component may be incorporated in any compositions which requires active ingredients to be protected against moisture during storage, against chemical reactions with other ingredients, migration or phase separation of ingredients, or protection against physical forces.

In particular, the foam component is useful in cleaning compositions, fabric care compositions, personal care compositions, cosmetic compositions, pharmaceutical compositions. These compositions may be solid or liquid. They may comprise any additional ingredients, including additional amounts of the active ingredients or polymeric material described above.

Preferred are laundry and dish washing detergent compositions and fabric conditioners and other rinse aids. The cleaning compositions typically contain one or more components selected from surfactants, effervescence sources, bleach catalysts, chelating agents, bleach stabilisers, alkalinity systems, builders, phosphate-containing builders, organic polymeric compounds, enzymes, suds suppressors, lime soap, dispersants, soil suspension and anti-redeposition agents, soil releasing agents, perfumes, dyes, dyed speckles, brighteners, photobleaching agents and additional corrosion inhibitors.

For laundry detergent compositions and fabric care compositions it may be preferred that the component preferably comprise at least one or more softening agents, such as quaternary ammonium compounds and/or softening clays, and preferably additional agent such as anti-wrinkling aids, perfumes, chelants, fabric integrity polymers.

In personal-care products it may be highly preferred to include cationic organic compounds, such as cationic surfactants. It can be preferred that the compositions comprise one or more other ingredient which can reduce dermatitis or compounds which can help the healing of the skin, metal-containing compounds, in particular zinc-containing compounds, vitamins and cortisone's, and also compounds to soften the skin such as vaseline, glycerin, triethyleneglycol, lanolin, paraffin and another group of polymers extensively employed by pharmaceutical and cosmetic manufactures, as also described herein.

The pharmaceutical compositions, cosmetic compositions and personal care compositions can be of any form and purpose. Preferred are pharmaceutical powders and tablets, cosmetic, pharmaceutical or personal care compositions to be applied to or inserted in the body and which are for example to be delivered to the body with controlled rate. The foam component can also be incorporated in absorbing articles, for example to release the actives in the foam component to the skin whereto the absorbing articles is applied, when in contact with water, such as body fluids, for example diapers, wipes, catamenials, plaster, bandages.

It may be preferred that the composition as a whole is comprised by the foam component. This is especially true when the composition is in a liquid form.

What is claimed is:

1. A composition comprising a foam component, wherein said foam component comprises a mixture of a polymeric material and a detergent enzyme selected from the group consisting of lipases, cutinases, amylases, neutral and alkaline proteases, cellulases, endolases, esterases, pectinases, lactases, peroxidases, and mixtures thereof: the foam component is in the form of particle, sheet or encapsulate, and is adapted for stability upon contact with air and instability upon contact with water such that at least 50 wt % of the polymeric material is dissolved or dispersed in 30 minutes after contact with water.

2. The composition according to claim 1, wherein at least part of the active ingredient is released upon contact with water.

3. The composition according to claim 1, wherein said polymeric material comprises a water-soluble polymer and/or a water-dispersible polymer.

4. The composition according to claim 1, wherein said foam component has an elastic modulus of less than 10 $GN.m^{-2}$.

5. The composition according to claim 1, wherein said foam component is in the form of particles having an average particle size of from about 50 to about 4000 microns.

6. The composition according to claim 1, wherein said foam component has a relative density of 0.05 to 0.9.

7. The composition according to claim 1, wherein said active ingredient further comprises an ingredient selected from the group consisting of: cleaning product ingredients, fabric care ingredients, pharmaceutical ingredients, cosmetic ingredients, personal care ingredients, and mixtures thereof.

8. The composition according to claim 1, wherein said active ingredient further comprises an acidic compound.

9. The composition according to claim 1, wherein said polymeric material comprises an acidic polymer and/or an additional acidic agent.

10. The composition according to claim 1, wherein said polymeric material comprises a water-soluble polymer selected from the group consisting of: polyvinylalcohol, polysaccharides, polycarboxylic acids, cellulose, modified cellulose, gums, and derivatives of said polymers and mixtures thereof.

11. The composition according to claim 1, wherein said foam component further comprising a plasticizer selected from the group consisting of glycerol, ethylene glycol, diethyleneglycol, propylene glycol, sorbitol and mixtures thereof.

12. The composition according to claim 1, wherein said composition is a cleaning composition, fabric care composition, cosmetic composition, personal care composition or pharmaceutical composition.

13. The composition according to claim 12, wherein said composition is a cleaning composition which further comprises an adjunct ingredient selected from the group consisting of bleach catalysts, chelating agents, bleach stabilizers, alkalinity systems, builders, phosphate containing builders, suds suppressors, lime soaps, dispersants, soil suspending and anti-redeposition agents, soil release agents, dyes, dyed speckles, corrosion inhibitors, anti-wrinkle aids, fabric integrity polymers, and mixtures thereof.

14. The composition according to claim 12, wherein said composition is a personal care composition which further comprises an adjunct ingredient selected from the group consisting of cationic surfactants, zinc-containing compounds, vitamins, cortisones, skin softening agents, and mixtures thereof.

15. An absorbent article comprising the composition according to claim 1, wherein the absorbent article is selected from the group consisting of diapers, wipes, catemenials, plaster, bandages, and mixtures thereof.

16. The composition according to claim 1, wherein said composition further comprises an active ingredient selected from the group consisting of surfactants, brighteners, dyes, suds suppressers, bleach activators, fabric softeners, fabric conditioners, antibacterial agents and mixtures thereof.

* * * * *